March 25, 1969     E. A. WEISS     3,435,451

TEMPERATURE DIFFERENCE DETECTOR

Filed Aug. 17, 1964

INVENTOR.

ERIC A. WEISS

BY *George L. Church*

ATTORNEY

United States Patent Office 3,435,451
Patented Mar. 25, 1969

3,435,451
TEMPERATURE DIFFERENCE DETECTOR
Eric A. Weiss, Springfield, Pa., assignor to Sun Oil Company, Philadelphia, Pa., a corporation of New Jersey
Filed Aug. 17, 1964, Ser. No. 390,073
Int. Cl. G08b *21/00;* G01k *1/02*
U.S. Cl. 340—413                                    4 Claims

ABSTRACT OF THE DISCLOSURE

The outputs of a plurality of sensing devices (e.g., thermocouples) are automatically monitored, and an alarm is given whenever the spread between the maximum and minimum values of these outputs is less than (or, alternatively, greater than) a preset value.

---

This invention relates to a temperature difference detector, and more particularly to a detector which measures the temperature separation between the lowest and highest of a group (plurality) of temperature readings which are in general unequal, and then gives an alarm if this temperature separation or "spread" differs from a preset, specified value. By way of example, the detector may be arranged to give an alarm if the maximum temperature difference (i.e., the maximum temperature separation) between any pair of a number of temperature readings is less than some limit. In fact, reference will be made to a particular process wherein monitoring of the process with this sort of a detector arrangement provides useful and valuable results. However, the invention is not limited to this sort of a detector arrangement; as will be explained hereinafter, the detector may be (alternatively) arranged to give an alarm if the maximum temperature difference (i.e., the maximum temperature separation between any pair of a number of temperature readings is greater than some limit.

It is frequently necessary, in the control of processes, to scan several temperatures and give an alarm if one of the temperatures exceeds a certain limit. Equipment to do this is common.

However, a more involved situation sometimes arises. In fluid catalytic cracking, temperature monitoring of the catalyst regenerator commonly takes place at a number of points within the regenerator. It has been found that when the regenerator is operating (under non-optimum conditions) in such a way as to leave excessive coke on the catalyst, the maximum temperature difference between any pair of a number of temperature readings (all of which are taken at similarly-located points, within the regenerator) decreases. Since the leaving of excessive coke on the catalyst, in the regenerator, is undesirable, an alarm should be given if the "spread" between the highest and lowest temperature readings becomes less than some predetermined limit which has been previously correlated with optimum operating conditions in the regenerator.

The manner in which this situation is normally handled will now be described. A thermocouple is installed at each of the similarly-located points, and all the thermocouple outputs are scanned in order with a self-balancing potentiometer, the temperature readings for all the points being printed out on a strip chart. The operator of the process examines this chart and takes suitable action if the "spread" between the highest and lowest temperature recorded becomes less than a specified limit.

An object of this invention is to provide a novel, automatic temperature difference detector circuit.

Another object is to provide a simple, reliable circuit arrangement which will automatically detect the fact that the spread between the maximum and minimum values of a number of measurements is more or less than a preset limit.

A further object is to provide a circuit arrangement which automatically monitors the outputs of a plurality of thermocouples and provides an indication whenever the maximum temperature difference between any pair thereof is more or less than a preset value.

A still further object is to provide a circuit arrangement which automatically monitors a number of measuring devices and provides an alarm whenever the spread between the maximum and minimum measured values is more or less than a preset value.

The objects of this invention are accomplished, briefly, in the following manner: In a first embodiment, the voltage outputs of the thermocouples are sequentially connected in pairs and in opposition to a voltage measuring device, the sequence including all possible pairs of thermocouples. The voltage measuring device carries pairs of contacts which are closed whenever the difference between the two voltages being measured at some particular time is sufficiently large; after the sequence is completed, a test circuit determines whether the contacts have closed during a sequence, and sounds an alarm if this has not happened. Alternatively, an alarm may be sounded if this has happened (i.e., if the contacts have closed during the sequence).

In another embodiment, the voltage output of each thermocouple is connected sequentially and individually to a special type of voltage measuring device which, by means of settable "maximum" and "minimum" arms, detects the lowest and highest among the several voltage outputs. After the sequence is completed, a test circuit determines whether the difference between the "maximum" and "minimum" voltage outputs is less than some limit, and sounds an alarm if it is. Alternatively, an alarm may be sounded if this difference is not less than some limit (i.e., if it is greater than the limit).

A detailed description of the invention follows, taken in conjunction with the accompanying drawings, wherein.

For convenience, the description will be given with reference to the measurement of a set of thermocouple output voltages, but the concept of the invention applies equally well to the measurement of any set of electrical outputs which represent physical parameters, such as the electrical outputs of flowmeters, pressure gauges, or resistance thermometers. For purposes of discussion, the number of points (i.e., the number of sensing devices) will be spoken of as five, but this may be any finite number.

Figure 1:
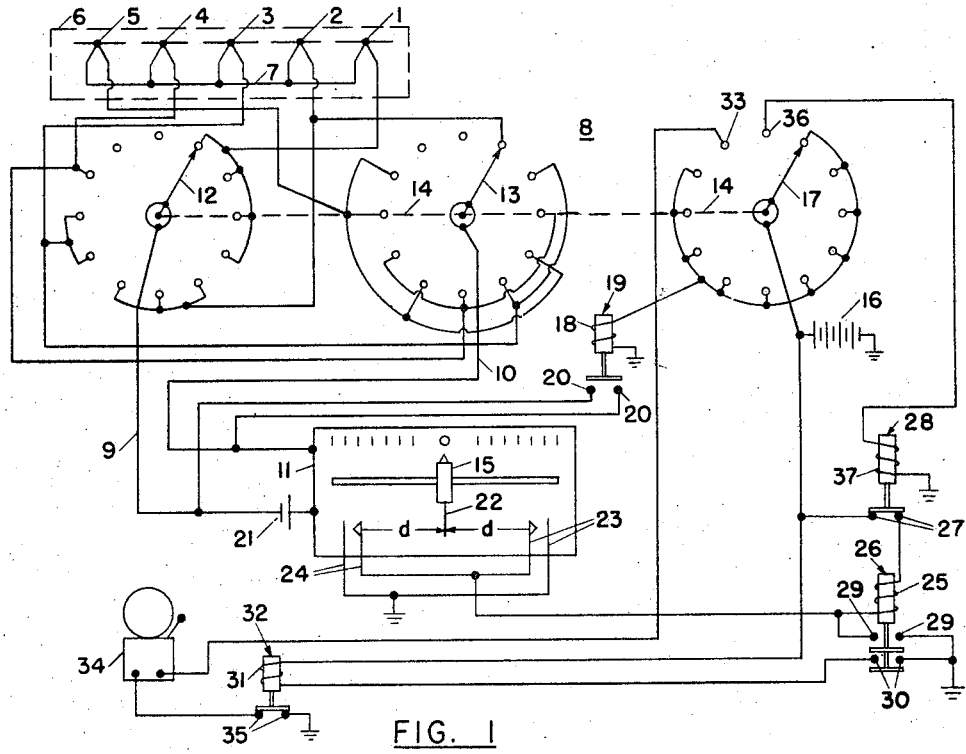
FIG. 1 is a schematic circuit diagram of one difference detecting system according to the invention.

Refer now to FIG. 1. Consider that a set of five thermocouples 1–5 is installed in a vessel 6 in which a process to be monitored is taking place (e..g., a regenerator for a fluid catalytic cracker), and an alarm is to be given if the absolute value of the difference between the highest temperature indicated by any one of the set of thermocouples (which particular thermocouple of the set will indicate the highest temperature, is unpredictable) and the lowest temperature indicated by any one of the set of thermocouples (which particular thermocouple of the set will indicate the lowest temperature, is likewise unpredictable) is less than a fixed difference, which will be caled D.

One side of each of the thermocouples 1–5 is connected to a common bus 7. The other sides of the thermocouples are connected to two banks or poles or decks of a three-pole ganged twelve-position rotary selector switch (denoted generally by numeral 8) in such a way that all possible pairs of thermocouples are successively coupled to the two input leads 9 and 10 of a voltage detector 11. Input lead 9 is connected to the movable contact 12 of the first deck of switch 8, and input lead 10 is connected to the movable contact 13 of the second deck of switch 8. The arrangement is such that as movable contacts 12 and 13 (ganged together by means of shaft 14, but insulated therefrom) rotate through a complete revolution, all possible pairs of thermocouples are sequentially connected in opposition (so that their differences are measured) to the voltage measuring means 11. Thus, in the one o'clock or illustrated position of switch 8, thermocouple 1 is connected to input lead 9 and thermocouple 2 is connected to input lead 10; in the two o'clock position, thermocouple 1 is connected to lead 9 and thermocouple 3 is conected to lead 10; in the three o'clock position, thermocouples 1 and 4 are connected to respective input leads of electrical measuring means 11; in the four o'clock position, thermocouples 1 and 5 are connected in opposition to the measuring means 11; in the five o'clock position, thermocouple 2 is connected to lead 9 and thermocouple 3 is connected to lead 10; in the six o'clock position, thermocouples 2 and 4 are connected in opposition to the voltage measuring device 11; in the seven o'clock position, thermocouples 2 and 5 are connected in opposition to measuring means 11; in the eight o'clock position, thermocouples 3 and 4 are connected in opposition to measuring device 11; in the nine o'clock position, thermocouple 3 is connected to input lead 9 and thermocouple 5 is connected to input lead 10; and in the ten o'clock position, thermocouple 4 is connected to lead 9 and thermocouple 5 is connected to lead 10.

The shaft 14 is preferably driven by a motor in a continuous manner, so that the scanning of the thermocouples (in pairs, as just described) takes place in a continuous, repetitive manner. As will be subsequently described, the eleven o'clock position of switch 8 is utilized for a "test" or "alarm" point, while the twelve o'clock position is utilized as an "alarm reset" point. Although the selection switch assembly is illustrated as comprising a three-pole ganged twelve-position selector switch, the same effect might be produced with a cross-bar switch assembly, or a matrix of relays, or a matrix of thermionic or solid-state switching devices.

A mechanical self-balancing potentiometer is a suitable electrical measuring means to be used at 11, although any mechanism which produces a mechanical movement proportional to the potential imposed at input leads 9 and 10 would do. As each successive pair of thermocouples (such as thermocouples 1 and 2, for example, in the illustrated position of switch 8) is connected to the potentiometer 11, the difference in voltage between this pair (which will represent the differencee in the temperatures sensed respectively by the two thermocouples of the pair) will cause the potentiometer pen carriage 15 to take a position representing this difference. In this connection, it will be remembered that the voltages of each pair are connected in opposition to potentiometer 11.

Since five thermocouples are illustratively used, there will be ten possible combinations of pairs of contacts, so that ten points or fixed contacts will be used in the first and second decks of switch 8, as previously described (to wit, those corresponding to the one o'clock through the ten o'clock positions). One terminal of a relay voltage source 16 (illustrated as a battery) is connected to the movable contact 17 of the third deck of switch 8, and the other terminal of source 16 is connected to ground.

The one o'clock through ten o'clock fixed contacts of the third switch deck are all connected together and to one end of the operating winding 18 of a relay 19; the other end of winding 18 is connected to ground. The movable contact 17 is fixed to shaft 14 but insulated from the shaft and is thus ganged to move with contacts 12 and 13; contact 17 is therefore illustrated on the one o'clock fixed contact of its deck, as are contacts 12 and 13 on their respective decks. In this switch position, winding 18 is energized from source 16 through an obvious circuit; relay 19 is therefore illustrated in the energized position. Relay 19 operates a pair of contacts 20 one of which is connected to input lead 9 and the other of which is connected to input lead 10; these contacts are opened when relay 19 is energized and are closed when this relay is de-energized. When contacts 20 are closed as a result of de-energization of relay 19, a short circuit is placed across the input of potentiometer 11. It may be seen that relay 19 is de-energized while the movable contact 17 is between the fixed contacts of the third deck of the switch 8, which means that the potentiometer input leads are short-circuited while the selector switch 8 (including, of course, the first and second decks thereof) is between the fixed contacts or points.

A bucking voltage, provided for example by a battery 21, is connected in series in the input lead 9. This bucking voltage has a value such as to bring the potentiometer carriage 15 to the mid-scale or zero position (as illustrated) whenever there is zero input to the potentiometer. Thus, the potentiometer indicator will be at mid-scale when the input leads are short-circuited (i.e., while the selector switch 8 is between its fixed contacts or points), or when the difference voltage between any pair of thermocouples is zero. Positive difference voltages will make the potentiometer arm 22 (mounted on potentiometer carriage 15) go in one direction (say upscale), and negative difference voltages will make it go in the other direction (say downscale).

A pair of contacts 23 is positioned a distance $d$ to the right of the zero point of carriage 15, in such a location that the movable one of these two contacts is engaged by arm 22, and pushed into engagement with the fixed contact of the pair, when carriage 15 has moved a distance $d$ to the right of the zero point. The distance $d$ is chosen to correspond to the voltage difference limit D, to which reference has been previously made. A pair of contacts 24 is positioned an equivalent distance $d$ to the left of the zero point of carriage 15, in such a location that the movable one of these two latter contacts is engaged by arm 22, and pushed into engagement with the fixed contact of the pair, when carriage 15 has moved a distance $d$ to the left of the zero point. As a result of the arrangement of contact pairs 23 and 24 in the manner described, the closure of either (or both) pairs of contacts during a scan of the pairs of thermocouples means that the voltage limit difference D has been exceeded during the scan, and closure of neither pair of contacts means that the voltage limit difference D has not been exceeded during the scan.

The contact pairs 23 and 24 are connected in parallel. One contact of each pair (say the fixed contact thereof) is connected to ground and thus to one terminal of source 16, while the other contact of each pair is connected to one end of the operating winding 25 of a relay 26. The other end of winding 25 is connected through the normally-closed contacts 27 of a relay 28 to the ungrounded terminal of source 16, so that when either of the contact pairs 23 or 24 is closed, a circuit is completed for energization of relay 26 from source 16. Relay 26 includes a pair 29 of normally-open holding contacts one of which is connected to ground and the other of which is connected to the movable contacts of contact pairs 23 and 24; when relay 26 is once energized, contacts 29 are closed to provide a holding or locking circuit to keep it energized until reset. Relay 26 includes another pair 30 of normally-open contacts one of which is connected to ground and the other of which is connected to one end of the operating winding 31 of a relay 32; the other end of winding 31 is connected directly to the ungrounded terminal of source 16. Thus, when contacts 30 close, the winding 31 of relay 32 is energized from source 16.

The eleven o'clock fixed contact or point 33 on the third deck of switch 8 is an alarm test point, and this point is connected to one terminal of an alarm device 34, which is illustrated for simplicity as a bell-type alarm. The other terminal of alarm 34 is connected through the normally-closed contacts 35 of relay 32, to ground. Thus, if contacts 35 are closed when movable contact 17 reaches point 33, alarm device 34 will be energized from source 16, sounding the alarm. If, on the other hand, contacts 35 are open when contact 17 reaches point 33, the circuit to alarm device 34 is broken, and this alarm will not be sounded.

As previously described, the energization of relay 26, by closure of its contacts 30, causes energization of relay 32, which latter energization disables the alarm circuit by the opening of contacts 35. Relay 26 becomes energized during the scan only if contacts 23 or 24 have been closed during the scan. If contacts 23 or 24 have not been closed during the scan cycle, relay 26 remains unenergized, as does relay 32, and contacts 35 remain closed, so that when (under these latter conditions) contact 17 reaches point 33, the alarm is sounded.

Thus, in the FIG. 1 circuit, an alarm will be given during each scan when no voltage difference (or temperature difference) exceeds the limit (D) set. If no temperature difference exceeds the limit set, all temperature differences are necessarily less than the limit set. Since in FIG. 1 all possible pairs of thermocouples are scanned, it is certain that at one of the "points" of switch 8, the highest temperature sensed by the set of thermocouples will be compared with the lowest temperature sensed by the thermocouples. An alarm will be given if the difference between the highest temperature and the lowest temperature is less than the fixed difference D (since if this difference is less than D, the contacts 23 or 24 will not be closed anytime during the scan cycle).

The first or twelve o'clock point 36 on the third deck of switch 8 is an alarm reset point, and this point is connected to one end of the operating winding 37 of relay 28; the other end of winding 37 is connected to ground. Thus, when movable contact 17 is on point 36, the winding 37 is energized from source 16, opening reset contacts 27 to de-energize or release relay 26 (and, as a result, relay 32), if relay 26 has been energized during the scan cycle.

In FIG. 1, the operating procedure consists of sequentially rotating the selector switch 8, repetitively, through complete revolutions. The first step (which takes place at the twelve o'clock position of the switch) opens the reset contacts 27, which releases the limit relay 26. In the second through eleventh steps (which take place from the one o'clock through the ten o'clock positions of the switch), the difference between each pair of thermocouples is applied to the potentiometer 11. In the twelfth step (which takes place at the eleven o'clock position of the switch), the limit relay 26 is tested. If it is open (i.e., unenergized), contacts 35 remain closed, and an alarm is given. The cycle is then repeated.

As may be appreciated, the circuit of FIG. 1 provides an alarm when no voltage difference exceeds or is greater than the limit set.

The FIG. 1 circuit utilizes short-circuiting contacts 20 which short-circuit the input to potentiometer 11 during the times wherein the movable contacts 12 and 13 are not on their points, or fixed contacts. Alternatively, the same result (to wit, the prevention of contacts 23 or 24 being closed, by the arm 22, when the movable contacts of the selector switch are not on their fixed contacts) could be obtained by utilizing a slow-acting potentiometer at 11, by making the movable contacts dwell on each fixed contact, and by making the fixed contacts on the selector switch in the form of bridging contacts.

The circuit of FIG. 1 requires a selector switch with two more points than the number of possible pairs of thermocouples. This presents no difficulty if the number of thermocouples is small, say about ten (in this latter case, the number of possible pairs would be forty-five). However, for large numbers of thermocouples, say thirty or more, the switching system of FIG. 1 will become unwieldy, and another embodiment may be preferable.

Figure 2:
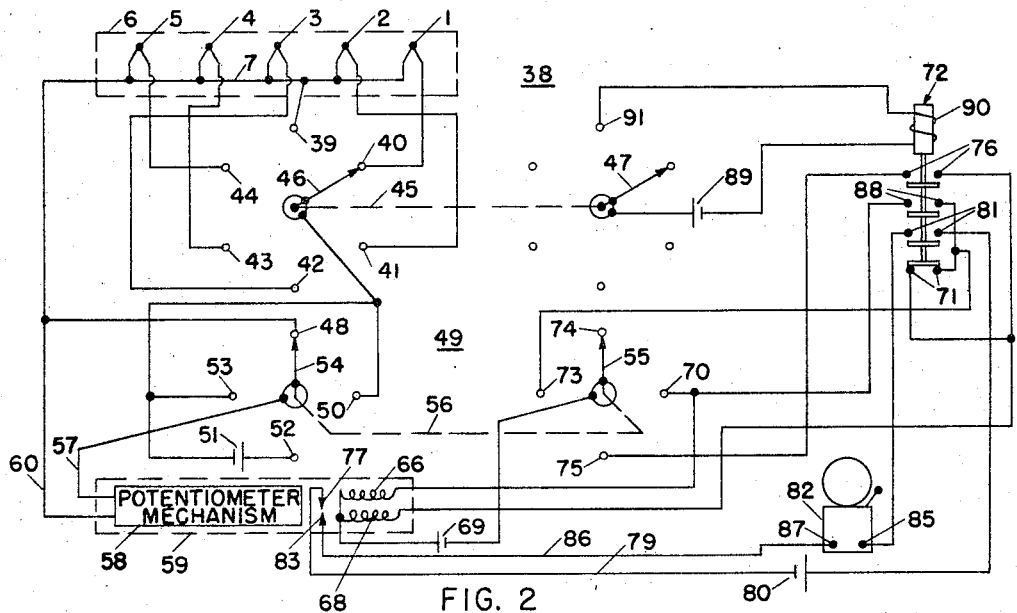
FIG. 2 is a similar diagram of another difference detecting system according to the invention.

Refer now to FIG. 2. The thermocouples 1–5 are connected to respective points in the first deck of a two-deck ganged six-position main rotary selector switch 38. One of the six positions (to wit, the twelve o'clock position) of switch 38 is used for interrogation and reset. As in FIG. 1, one side of each of the thermocouples 1–5 is connected to a common bus 7, and this bus is connected to the twelve o'clock switch point 39. The other side of the thermocouple 1 is connected to the two o'clock switch point 40, the other side of the thermocouple 2 is connected to the four o'clock switch point 41, the other side of the thermocouple 3 is connected to the six o'clock switch point 42, the other side of the thermocouple 4 is connected to the eight o'clock switch point 43, and the other side of the thermocouple 5 is connected to the ten o'clock switch point 44. The movable contact 46 of the first deck of switch 38 and the movable contact 47 of the second deck of this same switch are ganged together by means of a shaft 45.

The common bus 7 is connected to the first point 48 of the first deck of a two-deck ganged four-position auxiliary rotary selector switch 49. The movable contact 46 of the main selector switch 38 is connected directly to the second point 50 on this same deck of switch 49, is connected through a voltage source 51 to the third point 52 on this same deck of switch 49, and is connected directly to the fourth point 53 on this same deck of switch 49. The movable contact 54 of the first deck of switch 49 and the movable contact 55 of the second deck of this same switch are ganged together by means of a shaft 56.

The movable contact 54 is connected to one input lead 57 of a self-balancing potentiometer mechanism 58 which forms a part of a high-low detector-comparator device 59, while the common bus 7 is connected to the other input lead 60 of the potentiometer mechanism 58.

In FIG. 2, the main switch 38 simply switches each individual thermocouple separately to the auxiliary switch 49. The movable contact 46 of switch 38 stays at each thermocouple point such as 40 while the auxiliary switch 49 goes through its complete cycle. This cycle of the auxiliary switch 49 will now be described. In the first or illustrated position of switch 49 (i.e., contact 54 on point 48), zero voltage is connected to the input of the potentiometer 58, since in this switch position the potentiometer input leads 57 and 60 are short-circuited through point 48 and contact 54. In the second position of switch 49 (i.e., contact 54 on point 50), a selected thermocouple (i.e., a particular temperature point to be measured) is connected alone to the input of the potentiometer 58; for the particular position of main switch 38 which is illustrated, this would be thermocouple 1. In the third position of switch 49 (i.e., contact 54 on point 52), a voltage 51 sufficient to drive the potentiometer to the high end of the scale is connected in series with the selected thermocouple to the input of potentiometer 58. In the fourth position of switch 49 (i.e., contact 54 on point 53), the thermocouple selected by the main switch 38 is again connected alone to the input of potentiometer 58.

At the end of the above-described cycle of auxiliary switch 49, the main switch 38 advances to the next thermocouple (say thermocouple 2, connected to switch point 41), and the auxiliary switch 49 repeats its cycle. The auxiliary switch cycle is gone through once for each of the switch points 39, 40, 41, 42, 43, and 44. Although only five thermocouples are illustrated in FIG. 2, any number can be used, each thermocouple used being connected to a separate point on a main selector switch (similar to switch 38) having a suitable number of positions, one of the positions of such main switch (this is the twelve o'clock position in FIG. 2) being reserved for interrogation and reset as mentioned previously.

The potentiometer mechanism 58 drives a shaft 61 (see FIG. 4) to which is secured an indicator arm 62. A high limit arm 63 is journaled for free rotation on shaft 61, adjacent one face of arm 62, and a low limit arm 64 is journaled for free rotation on shaft 61, adjacent the opposite face of arm 62. The indicator arm 62 carries a first retractable pin 65 (see FIG. 3) which, when extended in response to energization of a solenoid 66 mounted on arm 62 adjacent this pin, engages arm 63 and thus acts as a clutch to drivingly couple arm 63 to arm 62; under these conditions, when shaft 61 rotates arm 62 of course rotates also, and carries the high limit arm 63 along with it. When solenoid 66 is not energized, pin 65 is not extended, and arm 62 moves without moving arm 63. The indicator arm 62 also carries a second retractable pin 67 which, when extended in response to energization of a solenoid 68 mounted on arm 62 adjacent pin 67, engages arm 64 and thus acts as a clutch to drivingly couple arm 64 to arm 62; under these conditions, when shaft 61 rotates arm 62 of course rotates also, and carries the low limit arm 64 along with it. When solenoid 68 is not energized, pin 67 is not extended, and arm 62 moves without moving arm 64. The indicator arms 63 and 64 are so journaled that they move only when driven by the pin on arm 62, and they stay fixed at their last position when not so driven.

One terminal of a suitable source of energization 69 (for example, a battery) is connected to one end of each of the solenoids 66 and 68, while the other terminal of source 69 is connected to the movable contact 55 of the second deck of auxiliary switch 49. See FIG. 2. The other or right-hand end of solenoid 68 is connected through the normally-closed contacts 71 of a relay 72 to the fourth point 73 on the second deck of switch 49. Thus, when the movable switch contact 55 is on point 70, solenoid 66 is energized from source 69; when contact 55 is on point 73, solenoid 68 is energized from source 69 through the relay contacts 71. The first point 74 on the second deck of switch 49 is left blank, i.e., unconnected to anything, while the third point 75 on this same deck is connected to one of a pair of normally-open contacts 76 on relay 72; the other contact of this pair 76 is connected to solenoid 68.

The connections of the switch 49, previously described, are such that when contact 54 is on point 50, contact 55 will be on point 70, energizing solenoid 66 and moving the pin 65 so that the high limit arm 63 will be picked up and carried with the potentiometer arm 62. When contact 54 is on point 53, contact 55 will be on point 73, energized solenoid 68 and moving the pin 67 so that the low limit arm 64 will be picked up and carried with the potentiometer arm 62. On points 74 and 75, neither of the arms 63 or 64 will be picked up, since on these switch points neither of the solenoids 66 or 68 is energized.

Assume that the detector-comparator device 59 has been reset so that the low limit arm 64 has been brought to the upper end of the possible range of travel of the potentiometer arm 62, and the high limit arm 63 has been brought to the lower end of the possible range of travel of said potentiometer arm; how this resetting is effected will be explained hereinafter. Consider that the main switch contact 46 is on the two o'clock switch point 40, so that thermocouple 1 is connected into the circuit. Now the auxiliary switch 49 will start its cycle. When contact 54 is on point 48, the input to the potentiometer arm 62 will go to the bottom of the scale; at this time, contact 55 is on the blank point 74.

When the auxiliary switch contact 54 is on point 50, the potentiometer arm 62 will move to the scale reading corresponding to the temperature of thermocouple 1; at this same time, switch contact 55 is on point 70, so that solenoid 66 is energized, extending the "high" pin 65 so that the high limit arm 63 is carried along with the potentiometer arm 62, from the lower end of the scale up to the scale reading corresponding to the temperature of thermocouple 1.

When the auxiliary switch contact 54 is on point 52, the potentiometer arm 62 will go to the high end of the scale, as moved by voltage source 51; at this time, switch contact 55 has moved away from point 70 and is on point 75, so that the solenoid 66 is no longer energized, causing the high limit arm 63 to be left at the balance point.

When the auxiliary switch contact 54 is on point 53, the potentiometer arm 62 will again move to the scale reading corresponding to the temperature of thermocouple 1 (i.e., to the balance point); at this same time, switch contact 55 is on point 73, so that solenoid 68 is energized, extending the "low" pin 67 so that the low limit arm 64 is carried along with the potentiometer arm 62, from the upper end of the scale down to the balance point.

As a result of the foregoing action, the high and low limit arms 63 and 64 will be at the same point, which is the balance point for thermocouple 1.

Now the main selector switch contact 46 is advanced to point 41, connecting thermocouple 2 into the circuit. Assuming that thermocouple 2 is at a higher temperature than thermocouple 1, the cycle of the auxiliary switch 49 will bring the high limit arm 63 to the balance point for thermocouple 2 and will leave the low limit arm 64 at the balance point for thermocouple 1, since under this assumed relation the potentiometer arm 62 will not encounter low limit arm 64 during its travel from the high end of the scale down to the (higher) balance point for thermocouple 2.

If thermocouple 2 were at a lower temperature than thermocouple 1, the cycle of the auxiliary switch 49 would bring the low limit arm 64 to the balance point for thermocouple 2 and would leave the high limit arm 63 at the balance point for the thermocouple 1, since under this condition the potentiometer arm 62 would not encounter high limit arm 64 during its travel from the low end of the scale up to the (lower) balance point for thermocouple 2.

After all the thermocouples 1–5 have been scanned by the manipulation of main switch contact 46 successively over points 40 through 44 (there being, as previously described, a complete cycle of auxiliary switch 49 for each of the main switch points), the high limit arm 63 will be at the balance point for the highest temperature scanned, and the low limit arm 64 will be at the balance point for the lowest temperature scanned. The difference (angular distance) between the positions of the high and low limit arms represents the maximum difference between the temperatures scanned. By providing an arrangement for detecting whether this difference between the two positions is greater than a certain desired minimum, the desired alarm can be tripped. That is to say, an arrangement can be provided for giving an alarm only if the angular separation between the two arms is less than the desired minimum, which means that the maximum temperature difference between the temperatures scanned is less than a stated minimum. Such an arrangement will now be described; it includes a pair of contacts which close only if the angular separation between the high and low limit arms is less than a certain desired minimum.

Figure 3:
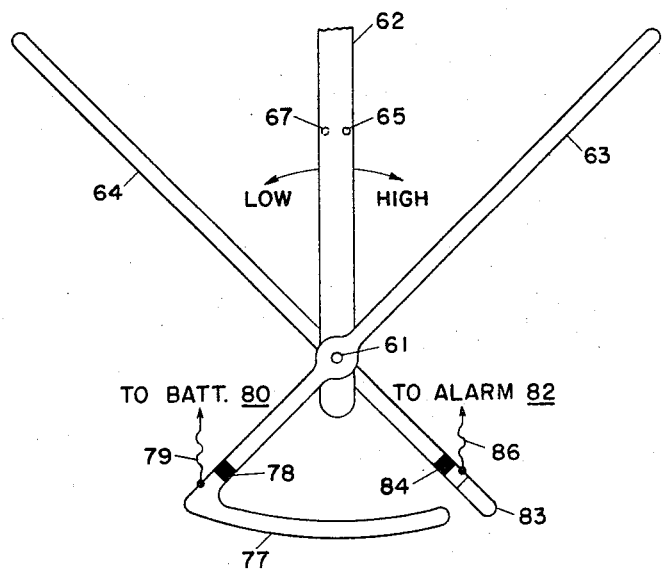
FIG. 3 is a plan or top view (somewhat schematic) of a detector-comparator device.
Figure 4:
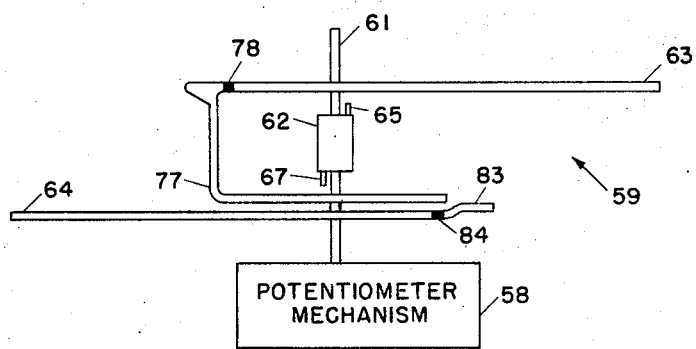
FIG. 4 is a front elevation of the detector-comparator device of FIG. 3.

As will be seen in FIG. 4, the two limit arms 63 and 64 are spaced from each other along the shaft 61, and the potentiometer indicator arm 62, with the associated solenoid-and-pin assembly 65–68, is between them. The potentiometer mechanism 58 (which drives the shaft 61 and arm 62) is typically located below the low limit arm 64. The high limit arm 63 is terminated in a metal strip 77 which is insulated from the arm itself by means of an insulating body 78. This strip 77 extends downwardly from the plane of arm 63 to immediately overlie the plane of low limit arm 64; this lower horizontally-extenidng portion of strip 77 is arcuate in shape, as illustrated in FIG. 3. One end of a flexible wire 79 is connected to strip 77, and the other end of this wire 79 (see FIG. 2, wherein strip 77 is depicted as a conventional contact) is connected to one terminal of an alarm-energizing source 80 (e.g., a battery). The other terminal of source 80 is connected to one of a pair of normally-open contacts 81 of relay 72, and the other one of these contacts is connected to one terminal 85 of an alarm device 82.

The low limit arm 64 is terminated in a metal strip 83 which is insulated from this arm by means of an insulating body 84. The strip 83 on arm 64 is simply an extension of this arm, and the strip 83 is bent upwardly, away from the plane of arm 64 (see FIG. 4) so that it can come into contact with the overlying strip 77. If the arms 63 and 64 are sufficiently close together( in an angular sense; see FIG. 3), arc 77 rides up over strip 83 and makes electircal contact therewith. If the angular separation between arms 63 and 64 is too great, strips 77 and 83 do not touch, and no electrical contact is made. Thus, a contact closure is made only if the maximum temperature difference between the thermocouples 1–5 is less than a certain stated minimum.

One end of a flexible wire 86 is connected to strip 83, and the other end of this wire (see FIG. 2, wherein strip 83 is depicted as a conventional contact) is connected to the other terminal 87 of alarm device 82.

Relay 72 has another pair of normally-open contacts 88. One contact of this latter pair is connected to point 70 on the second deck of auxiliary switch 49, and the other contact of this pair is connected to point 73 on this same deck.

As described hereinabove, the first or upper bank of the main selector switch 38 scans the thermocouples 1–5 one at a time, as the movable contact 46 engages points 40–44, one at a time and in succession. As previously described, this sets the high limit arm 63 of device 59 at the balance point for the highest temperature scanned, and the low limit arm 64 at the balance point for the lowest temperature scanned. Contacts 77 and 83 will be closed if the difference between the highest and lowest temperatures scanned is less than a stated minimum (since in this case, the angular separation between arms 63 and 64 will be such as to cause contact between strips 77 and 83).

The second or lower bank of the main switch 38 has blank (i.e., unconnected) points corresponding to points 40–44. At the twelve o'clock point 39, the first deck of switch 38 is connected to the common thermocouple bus 7, which means that when contact 46 is on point 39, this contact is connected to the common thermocouple bus.

The movable contact 47 of the second deck of main switch 38 is connected to one terminal of a relay-energizing source 89 (e.g., a battery), and the other terminal of this source is connected through the operating winding 90 of relay 72 to the twelve o'clock point 91 on the second deck of switch 38, so that when switch contact 47 engages switch point 91, an energization circuit is completed through coil 90 to operate relay 72. The twelve o'clock position of main switch 38 is the interrogation and reset position thereof.

The operation of relay 72 closes the interrogation contacts 81 thereof, and since these contacts are in series with contacts 77 and 83 in the alarm circuit, an alarm will sound if contacts 77 and 83 are closed at the time of interrogation.

The closure of reset contacts 76 of relay 72 connects the "low limit" solenoid 68 to point 75 on the second deck of auxiliary switch 49, while the opening of contacts 71 of relay 72 disconnects this solenoid 68 from point 73 on the second deck of this switch. The closure of reset contacts 88 of relay 72 connects the "high limit" solenoid 66 to point 73 on the second deck of switch 49.

Now when the auxiliary switch 49 goes through its cycle (main switch 38 being at the twelve o'clock position and relay 72 consequently being energized), a resetting action will take place, and this will now be described.

For the first step in the resetting cycle, contact 54 is on point 48 and contact 55 is on the blank point 74. The input leads 57 and 60 to the potentiometer mechanism 58 are now short-circuited through contact 54 and point 48, causing the potentiometer arm 62 to go to its low limit.

For the second step in the resetting cycle, contact 54 is on point 50 and contact 55 is on point 70. The "high" solenoid 66 is energized, but the potentiometer arm 62 stays at the low end of the scale because the potentiometer input leads 57 and 60 remain short-circuited (now by way of contact 54, point 50, contact 46, point 39, and bus 7).

For the third step in the resetting cycle, contact 54 is on point 52 and contact 55 is on point 75. The "low" solenoid 68 is now energized, via closed relay contacts 76, point 75, and contact 55; the high-scale driving voltage 51 is now connected across the potentiometer input leads 57 and 60 via contact 54, point 52, contact 46, and point 39. Therefore, during this step of the cycle, the low limit arm 64 is picked up (due to the extension of pin 67) and carried to the high end of the scale as the potentiometer arm 62 moves from the low end to the high end of the scale (as driven thereto by voltage 51).

For the fourth step in the resetting cycle, contact 54 is on point 53 and contact 55 is on point 73. The "high" solenoid 66 is now energized, by way of closed relay contacts 88, point 73, and contact 55; the potentiometer input leads 57 and 60 are again short-circuited by way of contact 54, point 53, contact 46, point 39, and bus 7, so that the potentiometer arm 62 moves to the low end of the scale. Thus, during this step of the cycle, the high limit arm 63 is picked up (due to the extension of pin 65) and carried to the low end of the scale as the potentiometer arm 62 moves from the high end to the low end of the scale.

Resetting is now completed, and the scanning of the thermocouples 1–5 can begin again, by movement of main switch 38 to the two o'clock position (contact 46 on point 40).

The circuit arrangements of FIGS. 1 and 2 are such that (in each of these circuits) an alarm is given when the maximum temperature difference between any pair of a number of temperature readings is less than some limit. It will be recalled that, in FIG. 1, the alarm is given when neither of the pairs of contacts 23 or 24 have been closed at anytime during the measuring or scanning cycle, and, in FIG. 2, the alarm is given when contacts 77 and 83 are in a closed position at the end of the measuring cycle.

It is within the scope of this invention to provide a temperature difference detector which gives an alarm if the maximum temperature difference between any pair of a number of temperature readings is greater than some limit. This can be done by a rearrangement of the circuits of FIGS. 1 and 2, and such will now be described with reference to FIGS. 5 and 6.

Figure 5:
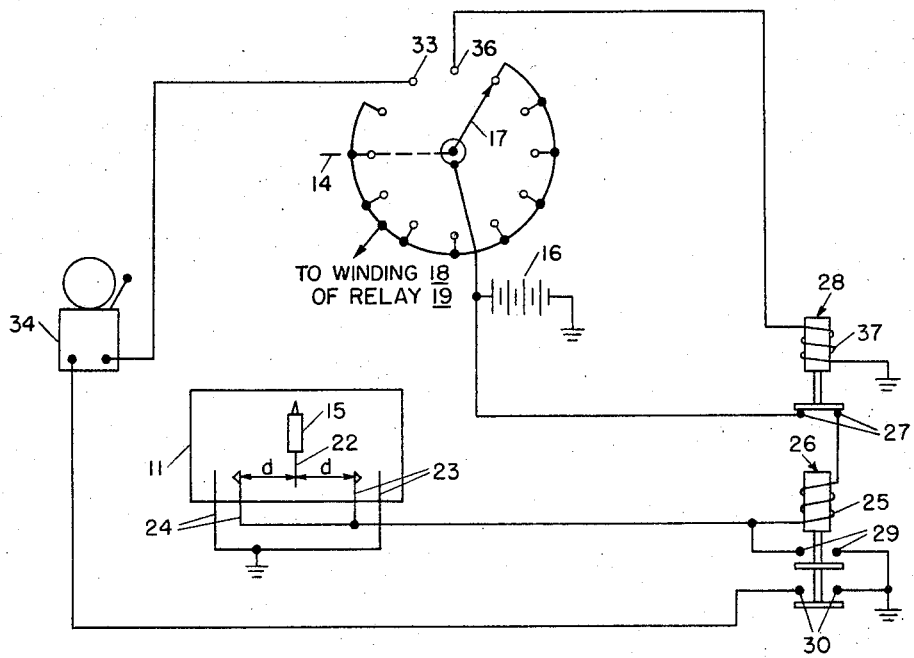
FIG. 5 is a modification of a portion of the circuit of FIG. 1.

Refer first to FIG. 5, which is a partial circuit diagram illustrating a modification of the FIG. 1 circuit. In FIG. 5, relay 32 is eliminated, and the left-hand terminal of alarm device 34 is connected to one of the normally open contacts 30 of relay 26, the other one of these contacts being connected to ground. Thus, when contact 17 reaches the alarm test point 33, alarm device 34 will be energized from source 16 if contacts 30 are then closed. Just as in FIG. 1, when either of the contact pairs 23 or 24 (in potentiometer 11) is closed, relay 26 is energized from source 16, and when this relay is once energized, holding contacts 29 are closed to keep it energized until reset. When relay 26 is energized, its contacts 30 close to complete a circuit from the left-hand terminal of alarm device 34 to ground (and to one side of battery 16).

Relay 26 becomes energized during the measuring scan if contacts 23 or 24 have been closed during the scan. Thus, in the FIG. 5 circuit, an alarm will be given during each scan when any voltage difference (or temperature difference), and particularly the maximum temperature difference, exceeds the limit (D) set. An alarm will be given in FIG. 5 if any temperature difference (such as the difference between the highest temperature and the lowest temperature) is greater than the fixed difference D (since if such temperature difference is greater than D, the contacts 23 or 24 will be closed sometime during the measuring cycle). As previously disclosed, the closure of either of these latter pairs of contacts causes closure of contacts 30, which prepares the alarm circuit to be completed subsequently when contact 17 reaches the alarm test point 33.

Figure 6:
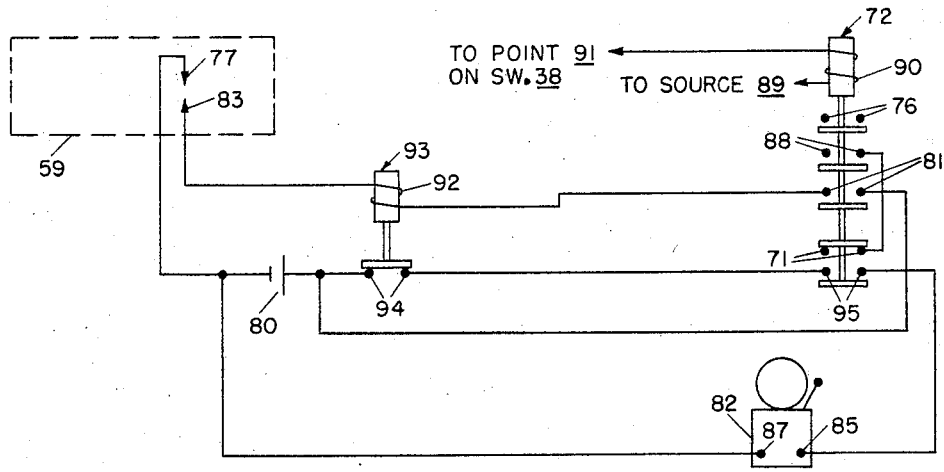
FIG. 6 is a modification of a portion of the FIG. 2 circuit.

Refer now to FIG. 6, which is a partial circuit diagram illustrating a modification of the FIG. 2 circuit. In FIG. 6, strip 77 (see FIGS. 3 and 4) is connected to one terminal of battery 80, and strip 83 is connected through the winding 92 of a relay 93 and through relay contacts 81 to the other terminal of battery 80. Thus, when strips 77 and 83 are in contact, relay 93 is energized from source 80, provided that contacts 81 are also closed. Relay 93 carries a pair of normally closed contacts 94 which are connected in series with a pair of normally open contacts 95 provided on relay 72, to form an energization circuit for alarm device 82, from battery 80.

As previously described in connection with FIG. 2, contacts 77 and 83 will be closed (at the end of the measuring cycle) if the difference between the highest and lowest temperatures scanned is less than a stated minimum; these contacts will be open (as a result of sufficient angular separation of the arms 63 and 64, FIG. 3) if this maximum temperature difference is greater than a stated minimum. In FIG. 6, it is desired to give an alarm if this maximum temperature difference is greater than some limit, which means that the alarm is desired to be given in FIG. 6 (at the end of the measuring scan) the contacts 77 and 83 are open.

When switch contact 47 (see FIG. 2) engages the interrogation and reset point 91, relay 72 is operated, as previously described in connection with FIG. 2. This closes its interrogation contacts 81, as well as its alarm contacts 95. If, at the time of interrogation, contacts 77 and 83 are open, relay 93 will not be operated even though relay contacts 81 are closed, and the normally closed contacts 94 of relay 93 will remain closed. In this case, when the contacts 95 of relay 72 close, the energization circuit for alarm device 82 is completed, and an alarm will sound. This means that an alarm will be given in FIG. 6 when the maximum temperature difference is greater than a pre-established minimum or limit (since in this case the angular separation between arms 63 and 64 is such that contacts 77 and 83 are open).

If, at the time of interrogation (when relay 72 operates), contacts 77 and 83 are closed, the closure of relay contacts 81 completes an energization circuit for relay 93, and this latter relay operates to open its contacts 94. Now, even though relay contacts 95 are closed (due to operation of relay 72), the energization circuit for the alarm device 82 is broken at 94, and no alarm will be sounded. Thus, in FIG. 6 no alarm is given when the maximum temperature difference is less than a pre-established minimum or limit (since in this case the angular separation between arms 63 and 64 is such that contacts 77 and 83 are closed).

The invention claimed is:

1. In combination, a plurality in excess of two sensing devices each of which produces an electrical output whose magnitude is proportional to the value of a respective physical parameter being sensed thereby, the electrical output of each of said sensing devices being completely fortuitous and unpredictable; means for automatically determining the maximum difference between any pair of said plurality of electrical outputs and for producing a characteristic effect whenever the amount of such maximum difference is less than a preset value, and means for interrogating said first-mentioned means to ascertain whether or not said effect has been produced and for providing an alarm if it has been so produced.

2. Combination as defined in claim 1, wherein said sensing devices are thermocouples which develop output voltages proportional in magnitude to temperatures.

3. Combination in accordance with claim 1, wherein said maximum difference determining means includes means for sequentially connecting said electrical outputs in pairs and in opposition to an electrical measuring means, the sequence including all possible pairs of electrical outputs.

4. Combination set forth in claim 1, wherein said maximum difference determining means includes means for sequentially and individually connecting said electrical outputs to an electrical measuring means, and means associated with said measuring means for detecting the lowest and highest among said electrical outputs.

References Cited

UNITED STATES PATENTS

| | | |
|---|---|---|
| 1,553,322 | 9/1925 | Miller. |
| 2,560,829 | 7/1951 | Stewart _____ 340—414 XR |
| 2,574,374 | 11/1951 | Bivens. |
| 2,762,978 | 9/1956 | Norton _____ 328—148 XR |
| 2,897,485 | 7/1959 | Johnson. |
| 3,209,343 | 9/1965 | Dunham et al. _____ 340—237 |
| 2,437,071 | 3/1948 | Cahusac et al. |
| 2,993,172 | 7/1961 | Karlicek. |
| 3,230,462 | 1/1966 | Kohl _____ 328—14.8 XR |

OTHER REFERENCES

IBM Tech. Discl. Bull. "Voltage Detection Circuit" by O'Malley, vol. 3, No. 6; November, 1960; p. 37.

JOHN W. CALDWELL, *Primary Examiner.*

DANIEL K. MYER, *Assistant Examiner.*

U.S. Cl. X.R.

340—181, 187, 228; 73—341